United States Patent
Harimoto et al.

(10) Patent No.: US 6,676,294 B2
(45) Date of Patent: Jan. 13, 2004

(54) ROCKING BEARING

(75) Inventors: Kazuyoshi Harimoto, Shizuoka (JP); Masatoshi Niina, Shizuoka (JP); Seiji Takahashi, Shizuoka (JP); Kousuke Obayashi, Shizuoka (JP); Ayumu Yamamoto, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/103,741

(22) Filed: Mar. 25, 2002

(65) Prior Publication Data

US 2002/0136475 A1 Sep. 26, 2002

(30) Foreign Application Priority Data

Mar. 26, 2001 (JP) ........................................ 2001-088160

(51) Int. Cl.$^7$ .............................................. F16C 32/00
(52) U.S. Cl. ........................... 384/2; 384/451; 384/569; 92/12.2
(58) Field of Search ..................... 384/2, 451, 456, 384/548, 569; 91/499; 92/12.2; 417/269; 74/60

(56) References Cited

U.S. PATENT DOCUMENTS

| | | | | |
|---|---|---|---|---|
| 4,029,367 A | * | 6/1977 | Schwede et al. | 384/2 |
| 4,627,330 A | * | 12/1986 | Beck, Jr. | 92/12.2 |
| 4,843,950 A | * | 7/1989 | Heyl | 91/506 |
| 4,856,917 A | * | 8/1989 | Schroder et al. | 384/550 |
| 4,858,480 A | * | 8/1989 | Rohde et al. | 74/60 |
| 5,083,431 A | * | 1/1992 | Tysver | 60/451 |
| 5,515,768 A | * | 5/1996 | Fritz et al. | 92/71 |
| 5,630,352 A | * | 5/1997 | Todd | 92/12.2 |
| 5,885,003 A | * | 3/1999 | Li | 384/2 |
| 6,027,250 A | * | 2/2000 | Reubelt et al. | 384/2 |

* cited by examiner

Primary Examiner—Thomas R. Hannon
Assistant Examiner—Julie K. Smith
(74) Attorney, Agent, or Firm—Wenderoth, Lind & Ponack, L.L.P.

(57) ABSTRACT

A rocking bearing is proposed which is low in cost. A raceway is formed on the inner periphery of an arcuate bearing ring. Rolling elements are received in pockets of a retainer provided opposite to the raceway. The bearing ring is formed by pressing a steel plate to reduce the cost and achieve light weight and compactness.

10 Claims, 5 Drawing Sheets

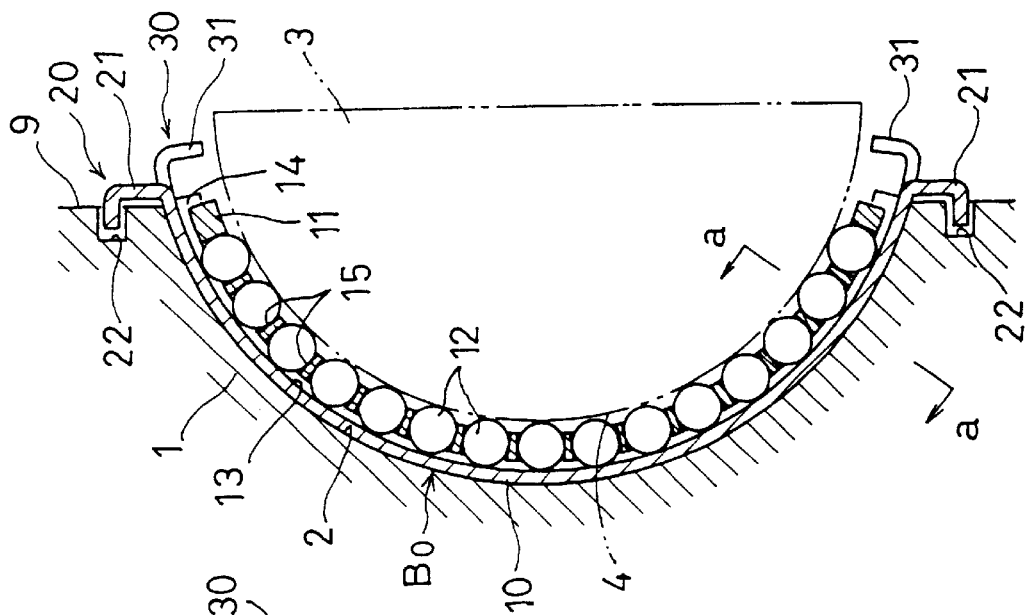
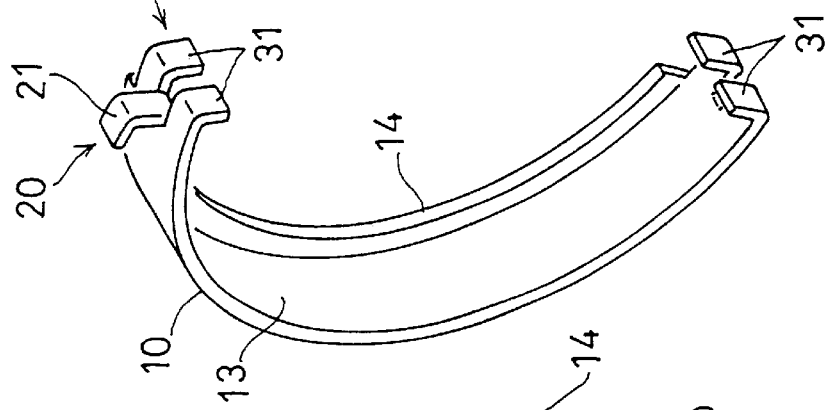
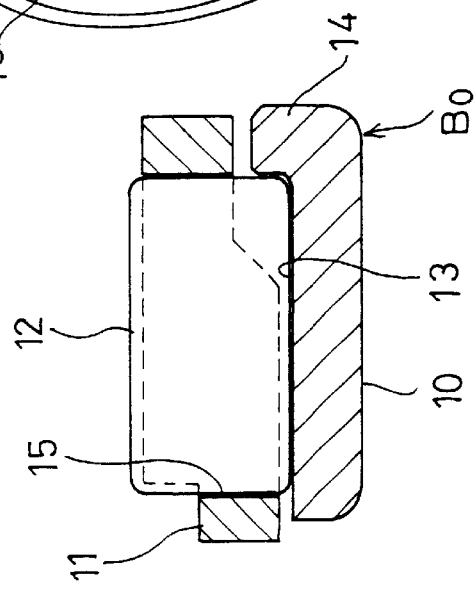
Fig. 1A
Fig. 1B
Fig. 1C

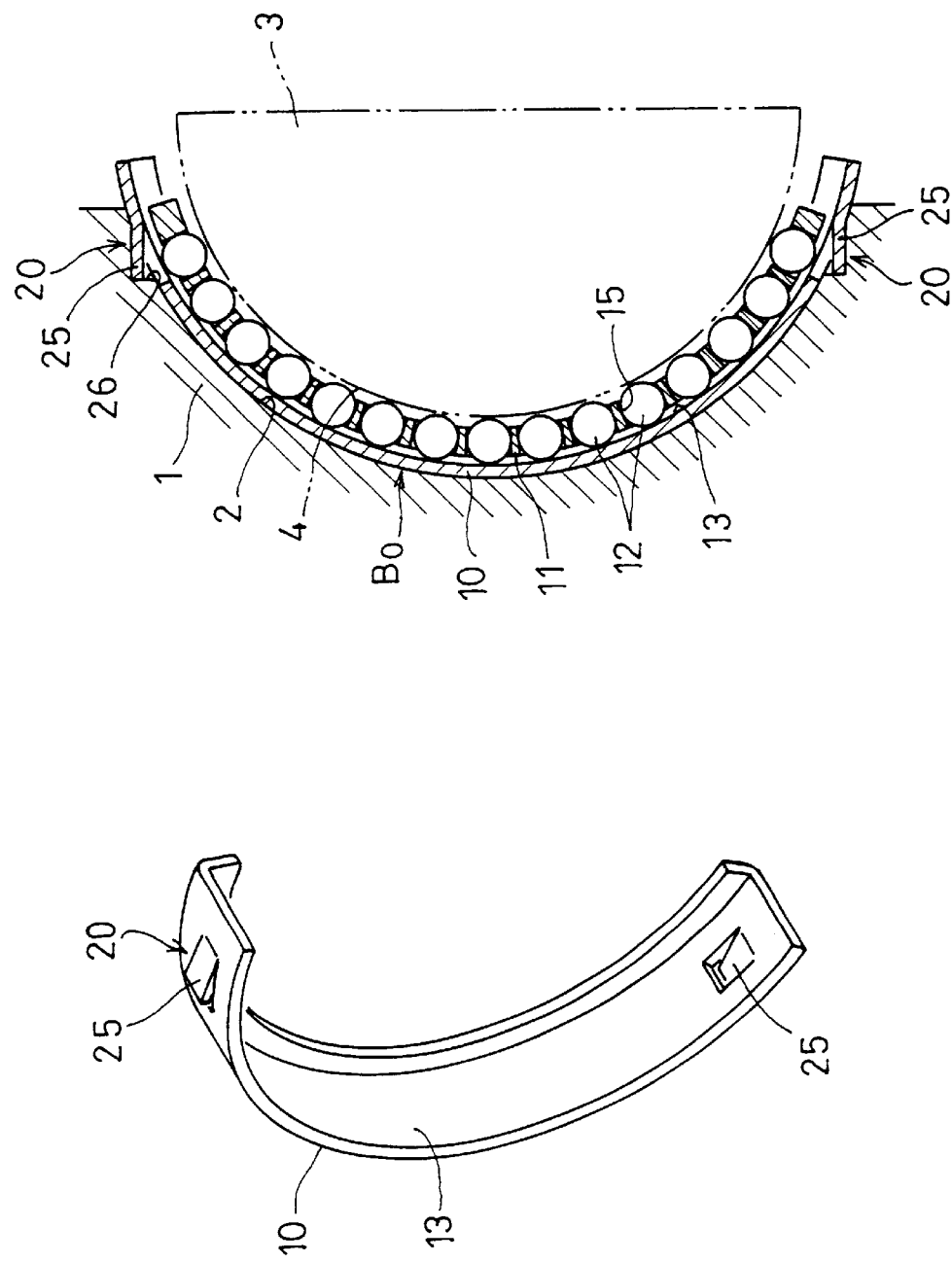

ROCKING BEARING

BACKGROUND OF THE INVENTION

This invention relates to a rocking bearing for rockably supporting a movable part such as a swash plate mounted in a swash plate type, variable-capacity plunger pump or a swash plate type hydraulic motor.

Generally, in a swash plate type plunger pump, as shown in FIG. 5, a rocking bearing B1 is mounted between a concave arcuate surface 2 formed on a housing 1 and a convex arcuate surface 4 formed on a swash plate 3 to rockably support the swash plate. By adjusting the inclination of a flat plunger guide surface 5 by the rocking of the swash plate 3, the stroke of a plunger 8 inserted in a cylinder 7 of a cylinder barrel 6 is adjusted to adjust the discharge amount.

As the rocking bearing B1 for rockably supporting the swash plate 3, one has been used which comprises an arcuate bearing ring 40 along the arcuate surface 2 of the housing 1, an arcuate retainer 42 mounted along a raceway 41 formed on the inner periphery of the bearing ring 40, and rolling elements 44 housed in pockets 43 of the retainer 42.

With such a known rocking bearing, the cost of the rocking bearing was high because the bearing ring 40 was a member formed by cutting.

If the rocking bearing B1 is merely mounted between the arcuate surface 2 of the housing 1 and the arcuate surface 4 of the swash plate 3, the entire rocking bearing B1 or the retainer 42 will displace in a circumferential direction with inclination adjustment of the plunger guide surface 5 or due to vibration during operation of the plunger pump. This makes it impossible to support the swash plate 3 with good stability.

Heretofore, between the housing 1 and the bearing ring 40, a pin hole 45 is formed in the housing 1 and a pin 46 is mounted in the bearing ring 40 to keep the bearing ring 40 in position by the engagement of the pin 46 in the pin hole 45.

Also, a rest arm 47 is provided between the housing and the swash plate 3, and part of the rest arm 47 is inserted in a cutout 48 formed in the retainer 42 to prevent circumferential displacement of the retainer 42.

But, the pin 46 as the positioning means for the bearing ring 40 and the arm 47 as the means for limiting the amount of rocking of the retainer 42 increases the number of parts and it is troublesome to mount the pin 46 or rest arm 47. Also, in order to mount the pin 46, a hole for the pin has to be formed in the bearing ring 40. Further, since the cutout for inserting the arm 47 has to be formed in the retainer 42, the machining cost is high.

A first object of this invention is to reduce the manufacturing cost of a rocking bearing.

A second object of this invention is to improve the ease of mounting of the rocking bearing.

SUMMARY OF THE INVENTION

According to this invention, there is provided a rocking bearing comprising a support member formed with a concave arcuate surface, a movable member formed with a convex arcuate surface, an arcuate bearing ring mounted between the concave arcuate surface formed on the support member and the convex arcuate surface formed on the movable member, an arcuate retainer mounted inside of the bearing ring so as to extend along an arcuate raceway formed on the inner periphery of the bearing ring and formed with a plurality of pockets, and rolling elements received in the pockets of the retainer for rockably supporting the movable member, characterized in that the bearing ring is formed by pressing a steel plate.

By forming the bearing ring by pressing a steel plate, it is possible to reduce the cost of the rocking bearing and to achieve light weight and compactness of the rocking bearing.

As the steel plate, SCM or SPCC may be used. The press-formed bearing ring is subjected to heat treatment after pressing to increase hardness. If strains develop during heat treatment, the rolling elements cannot smoothly roll. Thus, heat treatment is preferably carried out with the bearing ring in a mold.

According to this invention, by providing a rocking amount limiting means for limiting the rocking amount of the retainer between the bearing ring and the retainer, it is possible to prevent the retainer from shifting and dropping.

As the rocking amount limiting means, by providing engaging pieces bent inwardly from both ends of the bearing ring so as to oppose both ends of the retainer with a spacing therefrom to limit the rocking amount of the retainer, it is possible to eliminate the necessity for parts for limiting the rocking amount such as a rest arm. Thus, it is possible to reduce the number of parts of the rocking bearing and improve assembling properties.

By providing means for positioning the bearing ring relative to the support member between the support member and bearing ring, it is possible to prevent shifting of the bearing ring.

As the positioning means, one may be used in which L-shaped engaging pieces bent outwardly from both ends of the bearing ring are formed and the tips of the engaging pieces are engaged in positioning holes formed in a flat surface of the support member, or one in which positioning claws cut and raised from both ends of the bearing ring toward an outer surface side and the positioning claws are engaged in positioning recesses formed at both ends of the arcuate surface of the support member. In another embodiment, a protrusion is formed on the outer peripheral surface of the bearing ring by embossing, and the protrusion is engaged in a positioning hole formed in the arcuate surface of the support member.

Since in any of these positioning means, the positioning pieces, claws or protrusion are integrally provided, it is not necessary to mount additional parts for positioning. Thus it is possible to reduce the cost and improve ease of assembling of the rocking bearing due to a reduced number of parts.

Other features and objects of the present invention will become apparent from the following description made with reference to the accompanying drawings, in which:

BRIEF DESCRIPTION OF THE DRAWINGS

FIG. 1A is a sectional view of a first embodiment of the rocking bearing according to this invention in use;

FIG. 1B is a perspective view of its bearing ring;

FIG. 1C is a sectional view taken along line a—a of FIG. 1A;

FIG. 3A is a sectional view of a third embodiment in use;

FIG. 3B is a perspective view of its bearing ring;

DETAILED DESCRIPTION OF THE PREFERRED EMBODIMENTS

Figure 2A:
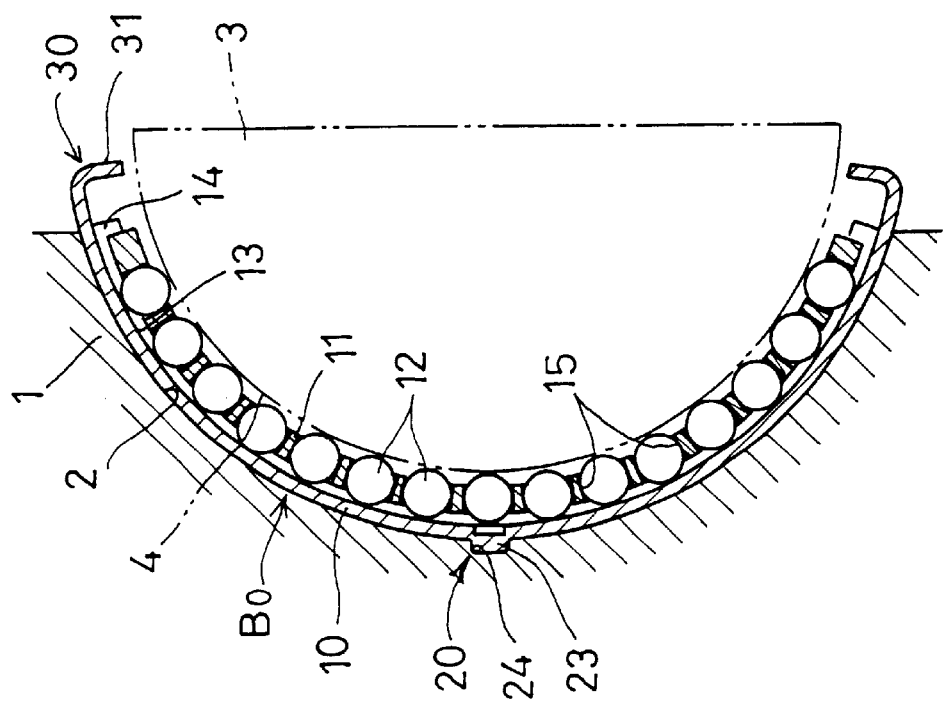
FIG. 2A is a sectional view of a second embodiment in use.

The embodiments of this invention will be described below. FIG. 1A shows an arrangement in which the rocking bearing B0 according to this invention is mounted between the housing 1 as a support member in the swash plate type plunger pump shown in FIG. 5 and the swash plate 3 as a movable member to rockably support the swash plate.

The rocking bearing B0 comprises a bearing ring 10, a retainer 11 and rolling elements 12. The bearing ring 10 is formed by pressing a steel plate. As the steel plate, SCM or SPCC is used.

As shown in FIGS. 1A–1C, the bearing ring 10 is arcuate and extends along the concave arcuate surface 2 formed on the housing 1, and inside of the bearing ring, an arcuate raceway 13 is formed. On one side of the bearing ring 10, a flange 14 for guiding end faces of the rolling elements 12 is formed. The flange 14 may be provided at both sides of the bearing ring 10.

The retainer 11 is arcuate so as to extend along the raceway 13 of the bearing ring 10. The retainer 11 has a plurality of pockets 15 formed at intervals in a circumferential direction, and the rolling elements 12 are received in the respective pockets 15. As the rolling elements 12, cylindrical rollers are used.

A positioning mechanism 20 for positioning the bearing ring 10 is provided between the bearing ring 10 and the housing 1. The mechanism 20 comprises a pair of L-shaped positioning pieces 21 extending outwardly from both ends of the bearing ring 10. The positioning pieces 21 have their tips engaged in positioning holes 22 formed in a flat surface 9 of the housing 1.

Also, between the bearing ring 10 and the retainer 11, a rocking amount restricting mechanism 30 for restricting the rocking amount of the retainer 11 is provided. It comprises a pair of engaging pieces 31 extending inwardly at both ends of the bearing ring 10. The engaging pieces 31 are spaced from and opposed to both ends of the retainer 11 and restrict the rocking amount of the retainer by abutment of both ends of the retainer 11 against the engaging pieces 31.

The bearing ring 10, which has the positioning piece 21 and the engaging pieces 31 at both ends, is subjected to heat treatment after press forming to increase hardness. If heat treatment produces strain in the bearing ring 10, it may impair rolling of the rolling elements 12. Thus, the bearing ring 10 should preferably be heat-treated in a mold.

Since the bearing ring 10 of the rocking bearing B0 is formed by pressing a steel plate, it is possible to considerably reduce the manufacturing cost and achieve light weight and compactness compared with the case in which the bearing ring is formed by cutting.

Also, by forming the bearing ring 10 by pressing a steel plate, it is possible to form the positioning pieces 21 and the engaging pieces 31 for restricting the rocking amount of the retainer 11. Thus, it is possible to eliminate the need for the pin 46 for positioning the bearing ring and the rest art 47 for restricting the rocking amount of the retainer 42 shown in FIG. 5. This achieves cost reduction and improves ease of assembly due to a reduced number of parts.

Figure 2B:
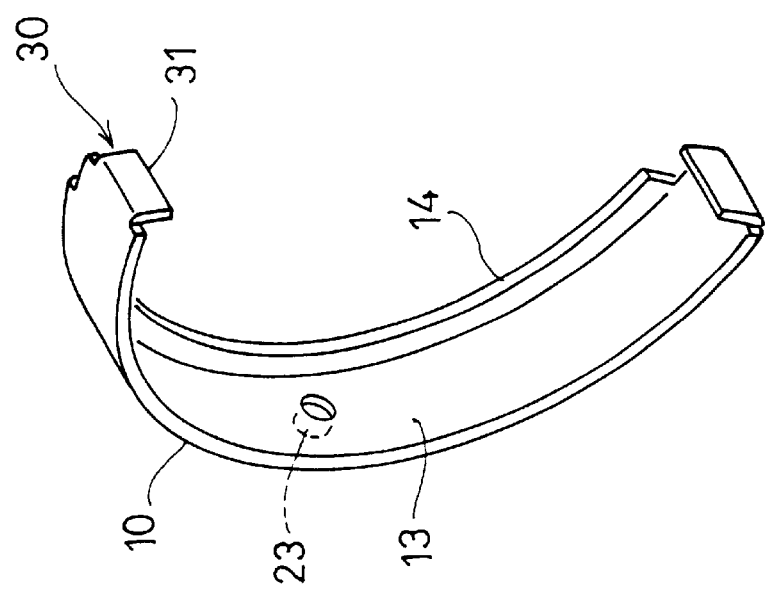
FIG. 2B is a perspective view of its bearing ring.

FIGS. 2A and 2B show the second embodiment of the rocking bearing B0 according to this invention. It differs from the rocking bearing B0 of the first embodiment shown in FIGS. 1A–1C only in the positioning mechanism 20 for the bearing ring.

Thus, for the same parts as in the first embodiment, the same numbers are used and their description is omitted. In the positioning mechanism 20 of the second embodiment, a protrusion 23 is formed on the outer peripheral surface of the bearing ring 10 to be engaged in a positioning hole 24 formed in the arcuate surface 2 of the housing 1 to hold the bearing ring 10 in position.

The protrusion 23 is formed by embossing. For embossing, the method described in Japanese patent publication 7-1067 can be used.

Figure 5:
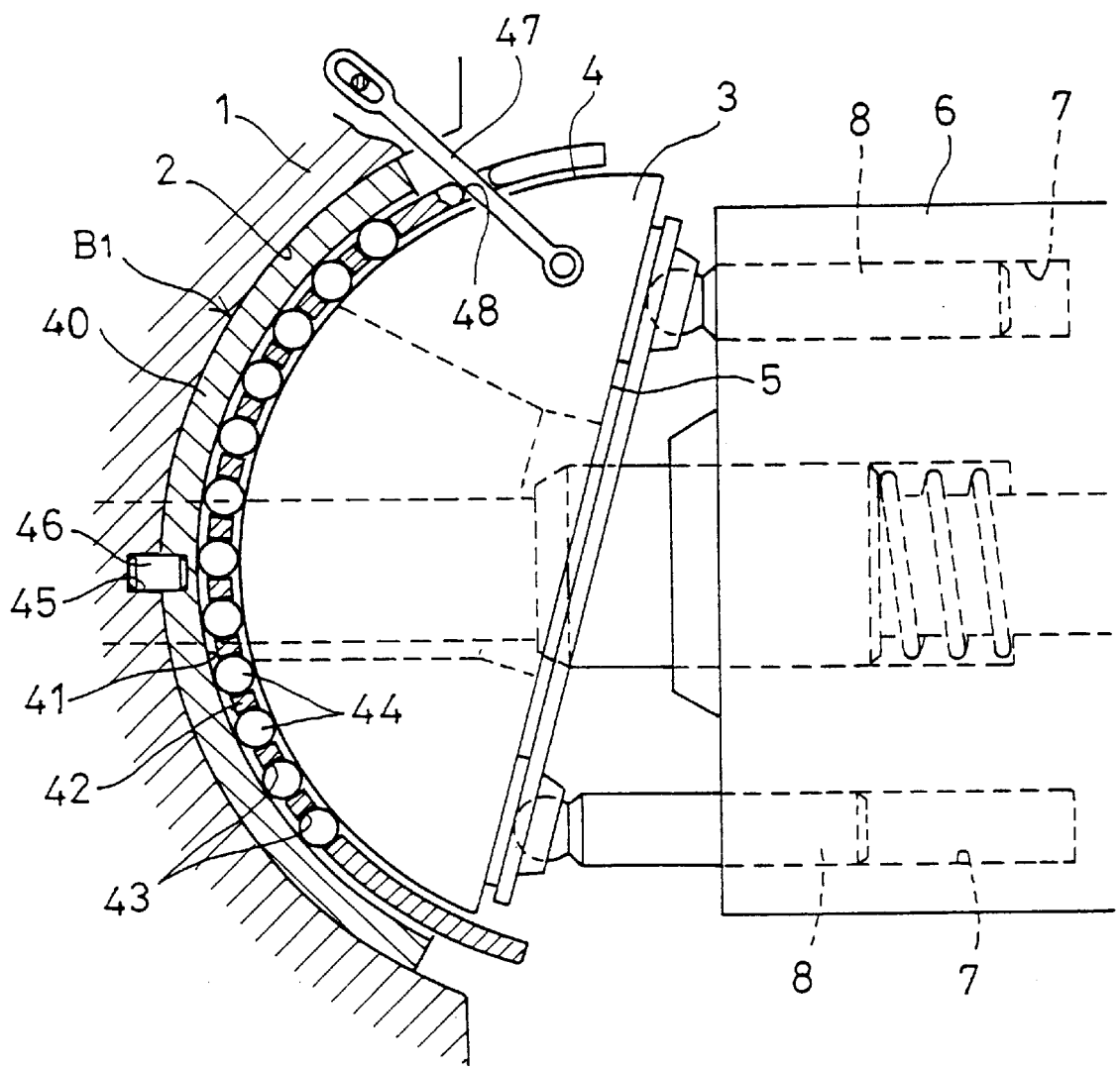
FIG. 5 is a vertical sectional front view of a conventional rocking bearing in use.

By integrally forming the protrusion 23 by embossing on the outer peripheral surface of the bearing ring 10, it is possible to reduce the number of parts compared with the arrangement in which the bearing ring 40 is positioned by providing the pin 46 on the bearing ring 40 as shown in FIG. 5. Also, since work involved in mounting the pin is not necessary, it is possible to reduce the cost of the rocking bearing.

FIGS. 3A and 3B show the third embodiment of the rocking bearing according to this invention. It differs from the rocking bearing shown in FIGS. 1A to 1C only in the positioning mechanism 20 for the bearing ring 10.

Thus, for the same parts as in the first embodiment, the same numbers are used and their description is omitted.

In the bearing ring positioning mechanism 20 of the rocking bearing shown in the third embodiment, a pair of cut-and-raised positioning claws 25 protruding outwardly are provided at both ends of the bearing ring 10. They are engaged in positioning recesses 26 formed in the arcuate surface 2 of the housing 1 at both ends to position the bearing ring 10.

In the third embodiment too, since the positioning claws 25 are integrally formed on the bearing ring 10, the pin 46 shown in FIG. 5 can be omitted. This lowers the cost of the rocking bearing.

Generally, with a support device for the swash plate 3 using a rocking bearing, it is a problem that large sounds are produced. As causes thereof, it is considered that in the support device, vibrations from outside the rocking bearing are large and the vibrations are transferred to the rocking bearing.

Also, with this support device, the rolling elements 12 of the rocking bearing are frequently in a stationary state. Thus, when vibrations from outside are transferred to the rocking bearing, it is considered that fretting can occur on the rolling elements 12 or the raceway 13.

Figure 4:
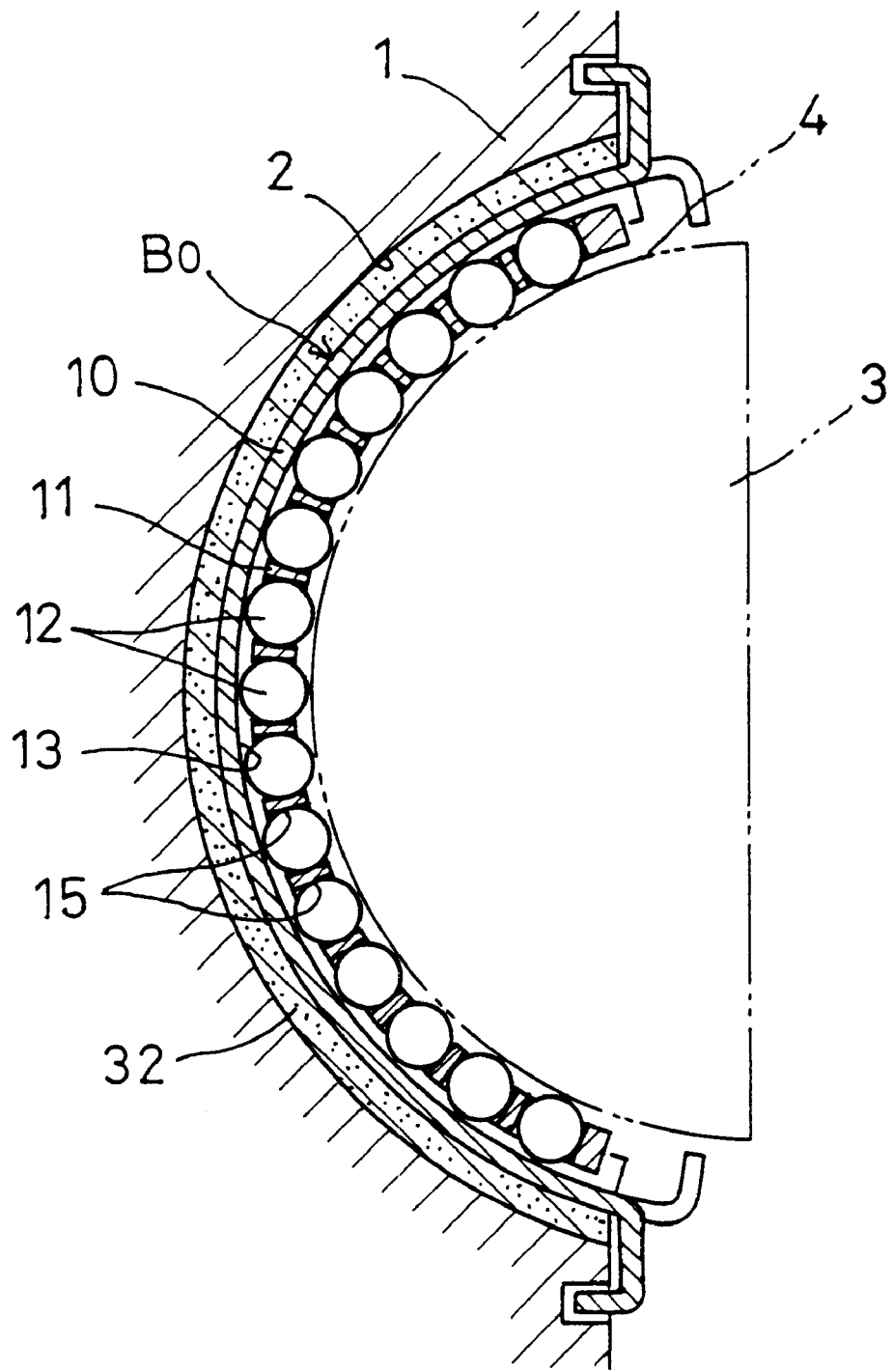
FIG. 4 is a vertical sectional front view showing another example of a support device using the rocking bearing according to this invention.

In order to prevent such a problem, in the support device shown in FIG. 4, an elastic member 32 is provided between the bearing ring 10 of the rocking bearing BO and the arcuate surface 2 of the housing 1. With such a structure, vibrations from outside can be absorbed by the elastic member 32, so that it is possible to prevent vibrations from being transferred to the rocking bearing B0.

According to this invention, since the bearing ring is formed by pressing a steel plate, it is possible to reduce the cost and weight of the rocking bearing and make it compact.

Also, since the positioning pieces and the positioning claws for positioning the bearing ring, the protrusion for positioning, or the engaging pieces for restricting the pivoting amount of the retainer are integrally formed on the bearing ring, it is possible to improve ease of assembling of the rocking bearing.

What is claimed is:

1. A rocking bearing comprising a support member formed with a concave arcuate surface, a movable member formed with a convex arcuate surface, an arcuate bearing ring mounted between the concave arcuate surface formed on said support member and the convex arcuate surface formed on said movable member, an arcuate retainer mounted inside of said bearing ring so as to extend along an arcuate raceway formed on the inner periphery of said bearing ring and formed with a plurality of pockets, and rolling elements received in said pockets of said retainer for rockably supporting said movable member, wherein said bearing ring is formed by pressing a steel plate, wherein a rocking amount limiting structure is provided between said bearing ring and said retainer for limiting the rocking amount of said retainer, and wherein said rocking amount limiting structure comprises engaging pieces bent inwardly from both ends of said bearing ring so as to oppose both ends of said retainer with a spacing therefrom.

2. A rocking bearing comprising a support member formed with a concave arcuate surface, a movable member formed with a convex arcuate surface, an arcuate bearing ring mounted between the concave arcuate surface formed on said support member and the convex arcuate surface formed on said movable member, an arcuate retainer mounted inside of said bearing ring so as to extend along an arcuate raceway formed on the inner periphery of said bearing ring and formed with a plurality of pockets, and rolling elements received in said pockets of said retainer for rockably supporting said movable member, wherein said bearing ring is formed by pressing a steel plate, wherein a positioning mechanism for positioning said bearing ring relative to said support member is provided between said support member and said bearing ring, and wherein said positioning mechanism comprises L-shaped engaging pieces bent outwardly from both ends of said bearing ring, and positioning holes formed in a flat surface of said support member to receive the tips of said engaging pieces.

3. A rocking bearing comprising a support member formed with a concave arcuate surface, a movable member formed with a convex arcuate surface, an arcuate bearing ring mounted between the concave arcuate surface formed on said support member and the convex arcuate surface formed on said movable member, an arcuate retainer mounted inside of said bearing ring so as to extend along an arcuate raceway formed on the inner periphery of said bearing ring and formed with a plurality of pockets, and rolling elements received in said rockets of said retainer for rockably supporting said movable member, wherein said bearing ring is formed by pressing a steel plate, wherein a positioning mechanism for positioning said bearing ring relative to said support member is provided between said support member and said bearing ring, and wherein said positioning means mechanism comprises positioning claws cut and raised to an outer surface side at both ends of said bearing ring, and positioning recesses formed in the arcuate surface of said support member at both ends to receive said positioning claws.

4. A rocking bearing comprising a support member formed with a concave arcuate surface, a movable member formed with a convex arcuate surface, an arcuate bearing ring mounted between the concave arcuate surface formed on said support member and the convex arcuate surface formed on said movable member, an arcuate retainer mounted inside of said bearing ring so as to extend along an arcuate raceway formed on the inner periphery of said bearing ring and formed with a plurality of pockets, and rolling elements received in said pockets of said retainer for rockably supporting said movable member, wherein said bearing ring is formed by pressing a steel plate, wherein a positioning mechanism for positioning said bearing ring relative to said support member is provided between said support member and said bearing ring, and wherein said positioning mechanism comprises a protrusion formed on the outer peripheral surface of said bearing ring, and a positioning hole formed in the arcuate surface of said support member to receive said protrusion.

5. A rocking bearing as claimed in claim 4 wherein said protrusion is formed by embossing.

6. A rocking bearing as claimed in claim 1 wherein a positioning means for positioning said bearing ring relative to said support member is provided between said support member and said bearing ring.

7. A rocking bearing as claimed in claim 6 wherein said positioning means comprises L-shaped engaging pieces bent outwardly from both ends of said bearing ring, and positioning holes formed in a flat surface of said support member to receive the tips of said engaging pieces.

8. A rocking bearing as claimed in claim 6 wherein said positioning means comprises positioning claws cut and raised to outer surface side at both ends of said bearing ring, and positioning recesses formed in the arcuate surface of said support member at both ends to receive said positioning claws.

9. A rocking bearing as claimed in claim 6 wherein said positioning means comprises a protrusion formed on the outer peripheral surface of said bearing ring, and a positioning hole formed in the arcuate surface of said support member to receive said protrusion.

10. A rocking bearing as claimed in claim 6 wherein said protrusion is formed by embossing.

* * * * *